Aug. 19, 1952　　　G. W. SCHOMAKER　　　2,607,833
TELEPHONE RINGER
Filed Dec. 18, 1947

*INVENTOR.*
GEORGE W. SCHOMAKER
BY
*Winfred T. Powell*
ATTORNEY

Patented Aug. 19, 1952

2,607,833

UNITED STATES PATENT OFFICE 2,607,833

TELEPHONE RINGER

George W. Schomaker, Rochester, N. Y., assignor to Stromberg-Carlson Company, a corporation of New York Application December 18, 1947, Serial No. 792,373

6 Claims. (Cl. 177—7)

This invention relates to electromagnetically operated ringing devices and it more particularly pertains to devices of this kind commonly known as telephone ringers.

The purpose of the present invention is to provide a ringer of improved construction which will be simple to manufacture, which can be quickly and accurately assembled, which will be efficient in operation and which will be relatively free from failures during service.

The principal object of the present invention is an arrangement of parts whereby a high efficiency permanent magnet is used which is much smaller and much more efficient than the permanent magnet commonly used in telephone ringers, with the consequent saving in space, ease of assembly and reduction in cost.

Other features and advantages of the invention will appear from the detailed description and claims when considered in connection with the drawing, in which:

Figure 3:
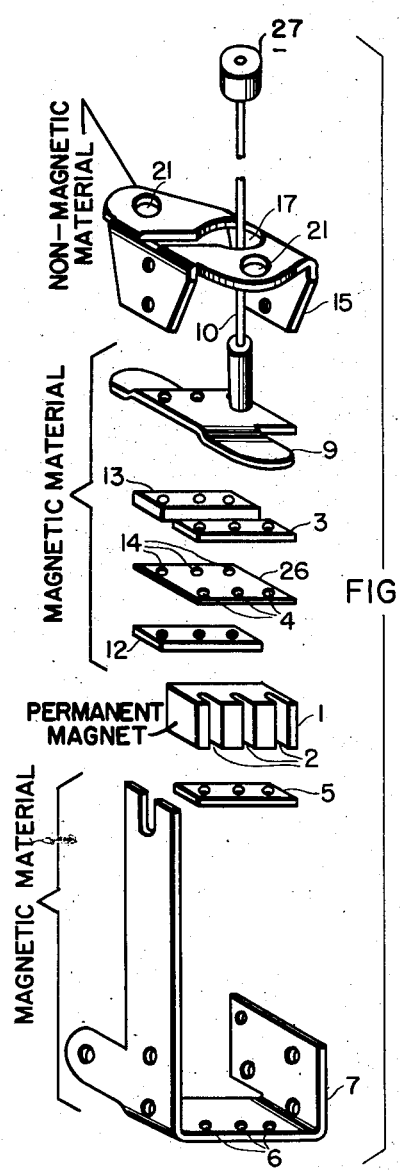
Fig. 3 is a view in perspective of parts of the ringer.

In the drawing, like numerals in the different figures identify the same parts. In accordance with my invention, I provide a yoke 15 made of a non-magnetic material such as brass. This yoke has a cross section in the shape of an upside-down U, that is, it has a flat surface with a pair of extensions, one on each side of the flat surface and extending downward at right angles thereto. Mounted on yoke 15 is a pair of magnetic coils, 23 and 24. The cores of these coils are secured to yoke 15 by means of a threaded portion which extends downward through holes 21 (see Fig. 3) in the yoke, these threaded ends being held in place by means of nuts 16 (see Fig. 1 or 2).

To the upper ends of magnetic coils 23 and 24 is attached, at extension 22a, a bracket 22, which is made of a magnetic material. Mounted on bracket 22 is at least one gong and preferably two as indicated in Fig. 1 by reference numerals 25 and 26.

Yoke 15 is supported by bracket 7, the latter also being made of magnetic material. Bracket 7 is of generally U-shaped configuration, with one upright portion of the U being longer than the other. Bracket 7 is secured to yoke 15 by screws 19 and 20, thus forming an enclosure defined by the inside surface of yoke 15 and the inside bottom surface of bracket 7. The longer upright portion of bracket 7 is secured to bracket 22 near its upper end by means of screw 18.

Rockably supported adjacent to the lower ends of the cores of coils 23 and 24 is an elongated armature 9. A magnetic circuit thus exists from the core of coil 23, through bracket 22, the core of coil 24, an air gap, armature 9, and a second air gap, to the core of coil 23. A striker 10 is mounted on armature 9; it extends upward in such a direction that weight 27 on its upper end is positioned to strike gongs 25 and 26. Armature 9 is rockably mounted by securing it to the rear portion (as viewed in Fig. 3) of reed 26, while the forward portion is secured to bracket 7.

Figure 1:
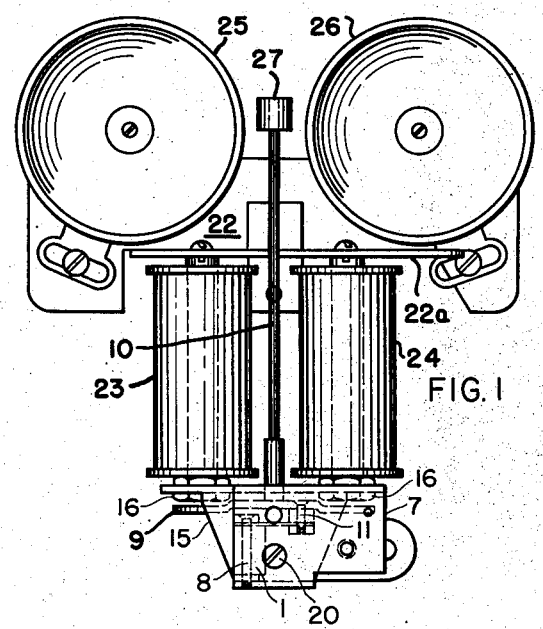
Fig. 1 is a front plan view of the ringer.
Figure 2:
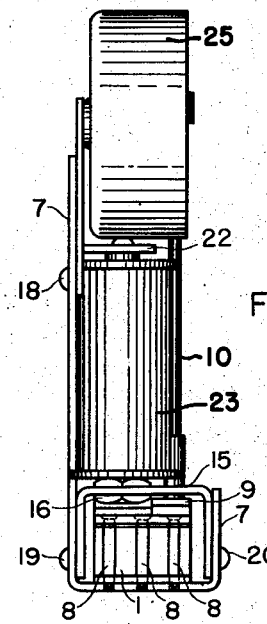
Fig. 2 is a side elevation of the ringer.

It will be understood by those skilled in the art that Figs. 1 and 2 of the drawings represent an assembled version of a telephone ringer according to my invention. The order of assembling parts may be best understood by reference to the exploded view of Fig. 3, in which the parts have been vertically displaced to show their relative locations. In assembling, the following parts are stacked in the following order from bottom to top: bracket 7, bottom plate 5, permanent magnet 1, reed 26, and top plate 3. Permanent magnet 1 is provided with cut-out portions 2, and the other parts enumerated are each provided with holes, those in reed 26 being designated by reference numerals 4 and those in bracket 7 by reference numerals 6. The holes 6 are tapped. In assembly, the holes in parts 3, 26 and 5 and the cut-out portions 2 of magnet 1 are aligned with holes 6. When this is done, non-magnetic screws, preferably of brass, are passed downward through the holes and cut-out portions 2, and are then tightened in tapped holes 6 to secure the parts rigidly together.

Next, armature 9 is secured to reed 26 through a similar alignment of holes in the following members in the top-to-bottom order enumerated: armature 9, top plate 13, reed 26, and bottom plate 12. Bottom plate 12 is provided with holes tapped to mate with screws of non-magnetic material which are passed downward through armature 9 and the holes in the parts enumerated (holes 14 in reed 26) and tightened to rigidly secure these parts together. These screws are designated by reference numeral 11 in Fig. 1. It is to be understood that these assembly operations must be performed before the attachment of yoke 15 to bracket 7. It will be noted that bracket 15 is provided with a hole 17 large enough so that yoke 15 may be slipped over the weight 27 on striker 10.

The use of permanent magnet 1 and its location within the telephone ringer assembly as pictured form major features of my invention. Looking at the permanent magnet in Fig. 3, the upper portion is one magnetic pole and the bottom portion is the other magnetic pole. Consequently, when assembled as seen in Fig. 2, the magnetic flux produced by magnet 1 flows from the upper portion of magnet 1, through armature 9, through the cores of the coils 23 and 24 in parallel, through the bracket 22 and back through bracket 7 (attached to bracket 22 by screw 18) to the lower portion of magnet 1.

When the coils of the electromagnets are energized from A. C. ringing current, the magnetic flux produced thereby in one core aids that produced by magnet 1, while the magnetic flux produced by the ringing current in the other core opposes that produced by magnet 1, thus rocking armature 9 back and forth on its reed suspension 26 for causing the weight 27 on the striker 10 to strike the gongs.

What I claim is:

1. In a telephone ringer; in combination; a pair of magnet cores; a yoke of non-magnetic material having a flat surface to which one end of said cores are attached, said yoke having a pair of extensions one on each side of said flat surface and extending at right angles thereto; a bracket of magnetic material attached to said extensions and cooperating therewith to form an enclosure; an armature of magnetic material flexibly supported within said enclosure; and a permanent magnet mounted within said enclosure between said armature and said bracket.

2. In a telephone ringer; in combination; a pair of magnet cores; a yoke of non-magnetic material having a flat surface to which one end of said cores are attached, said yoke having a pair of extensions one on each side of said flat surface and extending at right angles thereto; a bracket of magnetic material attached to said extensions and cooperating therewith to form an enclosure; an armature of magnetic material flexibly supported within said enclosure; and a permanent magnet mounted within said enclosure between said armature and said bracket, said bracket having an extension providing a magnetic circuit between said magnet and the other end of said cores.

3. In a telephone ringer; in combination; a yoke of non-magnetic material; a pair of magnet coils having cores attached at one end to said yoke and held in fixed parallel relation to each other; a bracket of magnetic material to which the other ends of said coils are attached; at least one ringer gong supported adjacent the ends of said coils which are attached to said bracket; an elongated armature of magnetic material supported adjacent the ends of said cores which are attached to said yoke, said armature extending in a direction approximately at right angles to said cores with the ends of the armature cooperating with the ends of said cores whereby each end of the armature alternately rocks back and forth with respect to the adjacent core; a striker operated by said armature to strike said gong; means including a flexible reed of magnetic material for mounting said armature in said above mentioned position; and a permanent magnet mounted between said armature and the portion of said bracket to which said other ends of said coils are attached.

4. In a telephone ringer; in combination; a yoke of non-magnetic material; a pair of magnet coils having cores attached at one end to said yoke and held in fixed parallel relation to each other; a bracket of magnetic material to which the other ends of said coils are attached; at least one ringer gong supported adjacent the ends of said coils which are attached to said bracket; an elongated armature supported adjacent the ends of said cores which are attached to said yoke, said armature of magnetic material extending in a direction approximately at right angles to said cores with the ends of the armature cooperating with the ends of said cores whereby each end of the armature alternately rocks back and forth with respect to the adjacent core; a striker operated by said armature to strike said gong; means including a flexible reed of magnetic material for mounting said armature in said above mentioned position; and a permanent magnet mounted between said armature and the portion of said bracket to which said other ends of said coils are attached, said magnet having one pole adjacent said armature and the other pole adjacent said other ends of said coils.

5. In a telephone ringer; in combination; a yoke of non-magnetic material, said yoke having a flat surface and a pair of extensions, one on each side of said flat surface and extending at right angles thereto; a pair of magnet coils having cores attached at one end to said yoke and held in fixed parallel relation to each other; a first bracket of magnetic material attached to said extensions and cooperating therewith to form an enclosure; a second magnetic bracket to which the other ends of said coils are attached; an elongated armature of magnetic material; means including a flexible reed of magnetic material for mounting said armature within said enclosure adjacent to the ends of said cores which are attached to said yoke, said armature extending in a direction approximately at right angles to said cores with the ends of said armature cooperating with the ends of said cores, whereby each end of the armature alternately rocks back and forth with respect to the adjacent core; a striker operated by said armature to strike said gong; and a permanent magnet mounted within said enclosure between said armature and the portion of said bracket to which said other ends of said coils are attached, said second bracket having an extension providing a magnetic circuit between said magnet and the other end of said cores.

6. In a telephone ringer; in combination; a yoke of non-magnetic material, said yoke having a flat surface and a pair of extensions, one on each side of said flat surface and extending at right angles thereto; a pair of magnet coils having cores attached at one end to said yoke and held in fixed parallel relation to each other; a first bracket of magnetic material attached to said extensions and cooperating therewith to form an enclosure; a second magnetic bracket to which the other ends of said coils are attached; an elongated armature of magnetic material; means including a flexible reed of magnetic material for mounting said armature within said enclosure adjacent to the ends of said cores which are attached to said yoke, said armature extending in a direction approximately at right angles to said cores with the ends of said armature cooperating with the ends of said cores, whereby each end of the armature alternately rocks back and forth with respect to the adjacent core; a striker operated by said armature to strike said gong; and a permanent magnet mounted within said enclosure between said armature and the portion of said bracket to which said other ends of said coils are attached, said second bracket having an extension providing a magnetic circuit between said magnet and the other end of said cores, said magnet having one pole adjacent said armature and the other pole adjacent said other ends of said coils.

GEORGE W. SCHOMAKER.

REFERENCES CITED

The following references are of record in the file of this patent:

UNITED STATES PATENTS

| Number | Name | Date |
| --- | --- | --- |
| 732,730 | Gemmill | July 7, 1903 |
| 2,249,835 | Lakatos | July 22, 1941 |
| 2,320,899 | Vincent | June 1, 1943 |
| 2,391,678 | Bundy | Dec. 25, 1945 |
| 2,414,699 | Olson et al. | Jan. 21, 1947 |